US 6,536,404 B2

(12) United States Patent
Liu et al.

(10) Patent No.: US 6,536,404 B2
(45) Date of Patent: Mar. 25, 2003

(54) PISTON HAVING COMBUSTION CHAMBER DEFINED IN THE CROWN

(75) Inventors: Zhengbai Liu, Lisle, IL (US); Xingun Gui, Lisle, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/911,265

(22) Filed: Jul. 23, 2001

(65) Prior Publication Data
US 2003/0015167 A1 Jan. 23, 2003

(51) Int. Cl.$^7$ ............................................. F02B 31/00
(52) U.S. Cl. ........................................ 123/263; 123/276
(58) Field of Search .................................. 123/261, 262, 123/276, 284, 263

(56) References Cited

U.S. PATENT DOCUMENTS

| | | | |
|---|---|---|---|
| 4,516,549 A | * | 5/1985 | Brear ........................ 123/262 |
| 4,721,280 A | | 1/1988 | Moriyasu et al. |
| 4,883,032 A | | 11/1989 | Hunter et al. |
| 5,029,563 A | | 7/1991 | Hu |
| 5,285,755 A | | 2/1994 | Regueiro |
| 5,605,126 A | * | 2/1997 | Hofmann et al. ........... 123/276 |
| 5,657,726 A | | 8/1997 | Diggs |
| 5,868,112 A | | 2/1999 | Mahakul et al. |
| 5,954,038 A | | 9/1999 | Warwick et al. |
| 6,098,588 A | * | 8/2000 | Hufnagel ..................... 123/261 |
| 6,161,518 A | * | 12/2000 | Nakakita et al. ............ 123/276 |

\* cited by examiner

Primary Examiner—John Kwon
(74) Attorney, Agent, or Firm—Dennis Kelly Sullivan; Jeffrey P. Calfa; Susan L. Lukasik

(57) ABSTRACT

A combustion chamber assembly for use in a diesel engine includes a combustion chamber being defined in a crown of a piston, the combustion chamber having a center portion being elevated relative to a bottom plane of the combustion chamber, the center portion being defined in part by a portion of a convex sphere, the sphere having a radius and an origin, the origin of the radius lying on a piston central axis and the combustion chamber further having an outwardly radially disposed bottom margin, the bottom margin being defined in part by a portion of a concave sphere, the sphere having a radius, the origin of the radius lying on the piston central axis and being greater than the center portion radius. The combustion chamber has a plurality of curved surfaces having smooth transitions between adjacent smooth surfaces, the smooth surfaces including the spherical center portion and the spherical bottom margin in combination with an annular sidewall surface. A piston incorporating the aforementioned combustion chamber and a method of forming the combustion chamber are further included.

61 Claims, 2 Drawing Sheets

US 6,536,404 B2

PISTON HAVING COMBUSTION CHAMBER DEFINED IN THE CROWN

TECHNICAL FIELD

The present invention relates to a piston designed for use in a compression ignition (diesel) internal combustion engine. More particularly, the present invention relates to a piston having a combustion chamber defined in the crown thereof.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the $NO_x$ entrained in the engine exhaust and minimizing the amount of soot particulate also entrained in the engine exhaust.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduced levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in $NO_x$ and entrained soot while at the same time maintaining or enhancing engine torque and power outputs.

SUMMARY OF THE INVENTION

The piston of the present invention substantially meets the aforementioned needs of the industry. The combustion chamber of the present invention defined in the crown of the piston has been shown by substantiated simulation to both reduce soot entrainment and $NO_x$ emissions while at the same time maintaining engine power output. The piston has been shown to function effectively with cylinder heads having two or more valves. A further advantage of the piston of the present invention is that by being symmetrical with respect to a piston central axis, the combustion chamber is relatively easily formed in the crown of the piston.

The present invention is a combustion chamber assembly for use in a diesel engine includes a combustion chamber being defined in a crown of a piston, the combustion chamber having a center portion being elevated relative to a bottom plane of the combustion chamber, the center portion being defined in part by a portion of a convex sphere, the sphere having a radius and an origin, the origin of the radius lying on a piston central axis and the combustion chamber further having an outwardly radially disposed bottom margin, the bottom margin being defined in part by a portion of a concave sphere, the sphere having a radius, the origin of the radius lying on the piston central axis and being greater than the center portion radius. The combustion chamber has a plurality of curved surfaces having smooth transitions between adjacent smooth surfaces, the smooth surfaces including the spherical center portion and the spherical bottom margin in combination with an annular sidewall surface. The present invention is further a piston having the aforementioned combustion chamber assembly and method of forming the aforementioned combustion chamber.

DETAILED DESCRIPTION OF THE DRAWINGS

Figure 1:
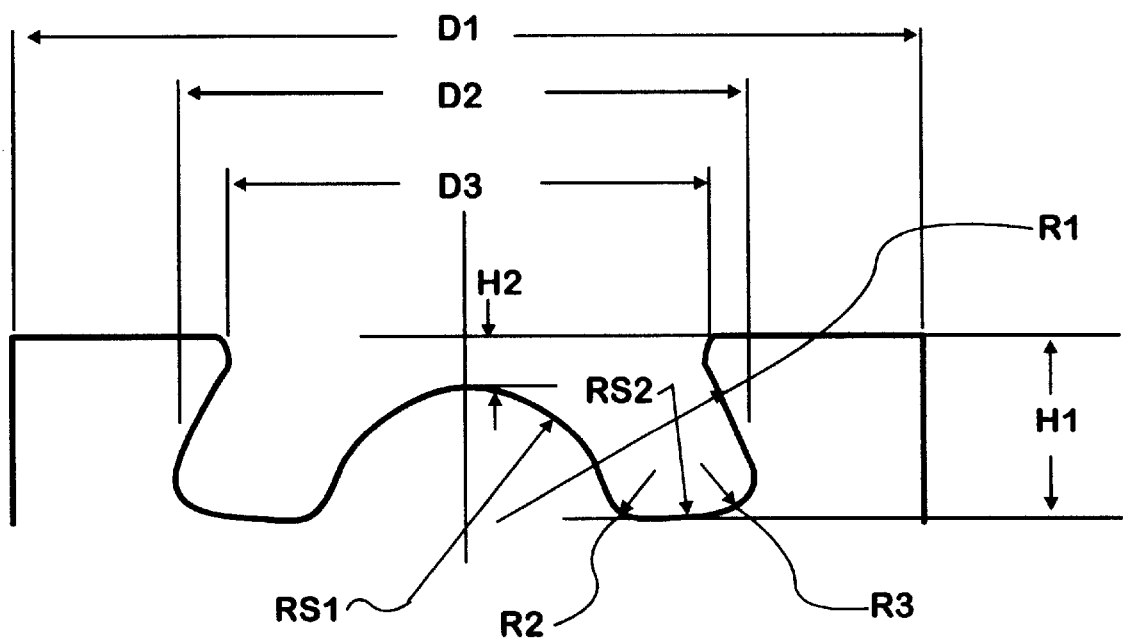
FIG. 1 is a sectional view of the piston of the present invention.

The piston of the present invention is shown generally at 10 in FIG. 1. Generally, the piston 10 has a centrally located symmetrical upward directed cavity for forming a major portion of a combustion bowl within a cylinder of a diesel engine, the engine having a fuel injector for forming a fuel injection plume. The piston 10 may be utilized with two-valve or multiple-valve heads. It is desirable that the fuel be injected proximate the center of the piston and that the injection pattern be radially symmetrical. In a preferred embodiment the injector injects a spray of fuel that has six subsprays that are equi-angularly displaced relative to the axis 16. The piston 10 is effective at reducing diesel engine pollutant emissions, such as NOx and soot. The piston is preferably applicable to heavy-duty and medium duty diesel engines.

The crown 12 of the piston 10 defines in part the upper margin of the piston 10. The combustion chamber 14 of the present invention is defined in the crown 12. It should be noted that the combustion chamber 14 is symmetrical about the longitudinal axis 16 and that longitudinal axis 16 is coincident with the center axis of the piston 10. The various radii (R), diameters (D), and heights (H) that will be described below are clearly indicated in the depiction of FIG. 1.

The combustion chamber 14 defined in the crown 12 of the piston 10 is comprised of curved surfaces, including spherical surfaces. The spherical surfaces are designated by a radius RS and the curved surfaces are designated by a radius R. The combustion chamber 14 has no flat surfaces. There is a smooth, generally tangential transition between the various curved surfaces that define the combustion chamber 14, as described in greater detail below.

Generally, the combustion chamber 14 is comprised of two spherical surfaces RS1 and RS2, RS1 defining a convex spherical surface and RS2 defining a concave spherical surface, generally comprising the bottom margin of the combustion chamber 14. The spherical surface RS1 is formed at the center of the combustion chamber 14 with the spherical surface RS2 being formed radially outward of the spherical surface RS1. The two spherical surfaces RS1 and RS2 are connected by a small annular surface having a radius R2 at the bottom of the combustion chamber 14. The combustion chamber sidewall is defined by a curved annular surface with a radius of R1. The sidewall curved surface R1 is connected to spherical surface RS2 by a curved surface having a radius of R3. The sidewall curved surface R1 transitions to a point of intersection with the crown 12 by means of a small curved surface(s), such as R4.

There are a number of parameters that control the geometry of the combustion chamber 14 and thereby control the diesel engine combustion performance as well as $NO_x$ and soot emissions. The convex spherical surface, defined by the radius RS1, is located in the central bottom space (center portion) of the combustion chamber 14. The origin 18 of the spherical surface RS1 is located on the center axis 16 of the piston 10. The distance between the origin 18 of the spherical surface RS1 and the point of intersection of the axis 16 with the bottom plane 20 of the combustion chamber 14 is equal to or greater than zero (a distance measured upward from the origin as depicted in FIG. 1 being positive) and should be less than 0.3 D1, D1 being the piston 10 diameter. Said distance is preferably zero wherein the origin 18 is coincident with the point of intersection 22 of the bottom plane 20 and the axis 16.

The concave spherical surface having the diameter RS2 has its point of origin 14 is on the axis 16 and is depicted in FIG. 1 well above the piston 10. The distance between the origin 24 of the spherical surface RS2 and the point of intersection 22 of the bottom plane 20 and the axis 16 is equal to or greater than 1.0 D1 and less than 8.0 D1 and is preferably 2.5 D1 (a distance measured upward from the point of intersection 22 of the bottom plane 20 and the axis 16 as depicted in FIG. 1 being positive).

The following ratios define certain parameters of the combustion chamber 14, D2 being the maximum diameter of the combustion chamber 14, D3 being the diameter of the combustion chamber 14 at the point of intersection with the crown 12, H1 being the maximum height of the combustion chamber 14, and H2 being the height from the peak of convex spherical surface RS1 to the crown 12.

(a) The ratio of RS1/D2 is greater than 0.11 and is less than 0.44, and is preferably 0.245.

(b) The ratio of RS2/D2 is greater than 1.5 and is less than 30.0, and is preferably 3.432.

(c) The ratio of D2/D1 is greater than 0.42 and is less than 0.88, and is preferably 0.635.

(d) The ratio of D3/D2 is greater than 0.7 and is less than 0.995, and is preferably 0.832.

(e) The ratio of H1/D2 is greater than 0.13 and is less than 0.49, and is preferably 0.318.

(f) The ratio of H2/D2 is greater than 0.005 and is less than 0.49, and is preferably 0.073.

(g) The ratio of R1/D2 is greater than 0.11 and is less than 0.65, and is preferably 0.412.

(h) The ratio of R2/D2 is greater than 0.01 and is less than 0.33, and is preferably 0.068.

(i) The ratio of R3/D2 is greater than 0.01 and is less than 0.33, and is preferably 0.068.

The curves and smooth transitions of the combustion chamber 14 as previously described promote smooth flow in the combustion chamber 14 and act to reduce the thermal loading in the combustion chamber 14. Further, the combustion chamber 14 is symmetrical about the axis 16. Accordingly, it is much easier to turn the combustion chamber 14 as compared to an asymmetrical combustion chamber defined in a piston.

Figure 2:
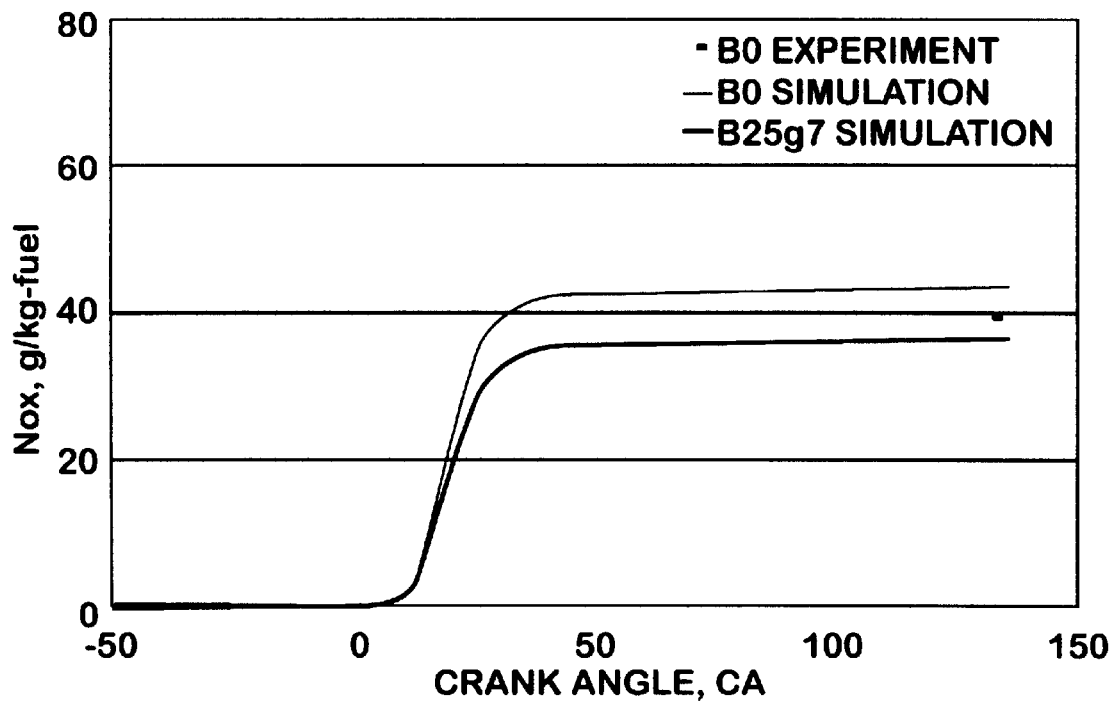
FIG. 2 is a graphic representation of an $NO_x$ generated by an existing piston and combustion chamber and the piston and combustion chamber of the present invention.
Figure 3:
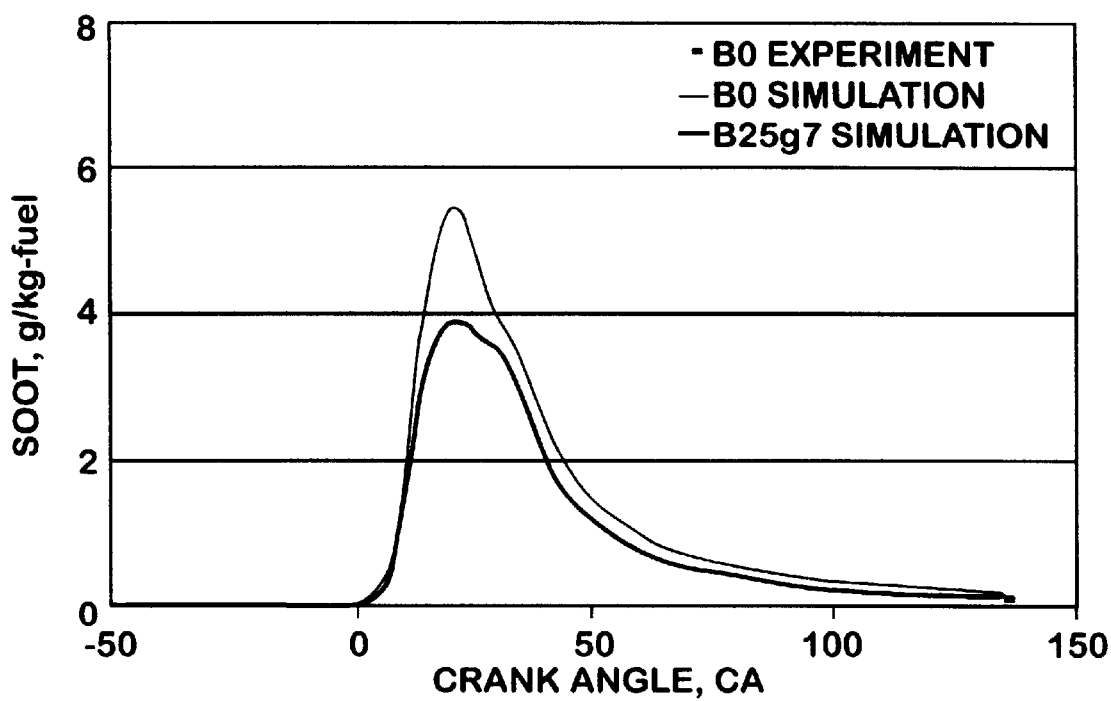
FIG. 3 is a graphic representation of the soot generated by an existing piston and combustion as compared to the piston and combustion chamber of the present invention.

Combustion performance improvement and pollutant emission reduction are depicted in FIGS. 2 and 3. FIG. 2 depicts the $NO_x$ generation of a known combustion chamber as depicted by line 28 and the simulated results of $NO_x$ generation of the combustion chamber 14 of the present invention as depicted in line 30. It is noted that the $NO_x$ generation by the combustion chamber 14 of the present invention (line 30) is significantly less than the $NO_x$ of the known combustion chamber as depicted by line 28.

FIG. 3 depicts the simulated soot generation of a known combustion chamber as depicted by line 28 in comparison with the simulated soot generation of the combustion chamber 14 of the present invention as depicted by line 30. It should be noted that soot generation of the combustion chamber 14 (line 30) is significantly less than the soot generation of the known combustion chamber (line 28).

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a diesel engine, comprising:

a combustion chamber being defined in a crown of a piston, the combustion chamber having a center portion being elevated relative to a bottom plane of the combustion chamber, the center portion being defined at least in part by a portion of a convex sphere, the sphere having a radius and an origin, the origin of the radius lying on a piston central axis and the combustion chamber further having an outwardly radially disposed bottom margin, the bottom margin being defined in part by a portion of a concave sphere, the sphere having a radius and an origin, the origin of the radius lying on the piston central axis and the bottom margin radius being greater than the center portion radius; and the combustion chamber having a plurality of curved surfaces having smooth transitions between adjacent smooth surfaces, the smooth surfaces including the spherical center portion and the spherical bottom margin and the annular sidewall surface.

2. The combustion chamber assembly of claim 1 wherein the origin of the center portion spherical surface lies in the bottom plane or lies above or below the bottom plane.

3. The combustion chamber assembly of claim 2 wherein the origin of the center portion convex spherical surface lies coincident with a point of intersection of the bottom plane with the piston central axis.

4. The combustion chamber assembly of claim 1 wherein the distance between the origin of the concave spherical bottom margin and the point of intersection of the bottom plane and the piston central axis is equal to or greater than 1.0 times the diameter of the piston, D1, and less than 8.0 D1.

5. The combustion chamber assembly of claim 4 wherein the distance between origin of the concave spherical bottom margin and the point of intersection of the bottom plane and the piston central axis is substantially 2.5 D1.

6. The combustion chamber assembly of claim 1 wherein the ratio of the radius of the center portion convex spherical surface, RS1, to the maximum diameter, D2, of the combustion chamber is greater than 0.11 and less than 0.44.

7. The combustion chamber assembly of claim 1 wherein the ratio of the radius of the center portion convex spherical surface, RS1, the maximum diameter, D2, of the combustion chamber is substantially 0.245.

8. The combustion chamber assembly of claim 1 wherein the distance between the origin of the convex spherical surface, RS1, and the intersection of the piston center axis and the bottom plane of the combustion chamber is equal to or greater than zero and less than 0.3 piston diameter, D1.

9. The combustion chamber assembly of claim 1 wherein the ratio of the radius of the concave bottom spherical surface, RS2, to the maximum diameter, D2, of the combustion chamber is between 1.5 and 30.0.

10. The combustion chamber assembly of claim 9 wherein the ratio of the radius of the concave bottom spherical surface, RS2, to the maximum diameter, D2, of the combustion chamber is substantially 3.432.

11. The combustion chamber assembly of claim 1 wherein the ratio of the diameter of the combustion chamber at the point of intersection with the crown of the piston, D3, to the maximum diameter of the combustion chamber, D2, is greater than 0.70 and less than 0.995.

12. The combustion chamber assembly of claim 11 wherein the ratio of the diameter of the combustion chamber at the point of intersection with the crown of the piston, D3, to the maximum diameter of the combustion chamber, D2, is substantially 0.832.

13. The combustion chamber assembly of claim 1 wherein the ratio of the maximum diameter of the combustion chamber, D2, to the diameter of the piston, D1, is between 0.42 and 0.88.

14. The combustion chamber assembly of claim 1 wherein the ratio of a certain distance, H1, the certain distance being the distance from the bottom plane to the crown of the piston, to the maximum diameter D2 of the combustion chamber is greater than 0.13 and less than 0.49.

15. The combustion chamber assembly of claim 14 wherein the ratio of the certain distance H1 to the maximum diameter D2 of the combustion chamber is substantially 0.318.

16. The combustion chamber of claim 1 wherein the ratio of the certain distance H2, H2 being the distance from a peak of the center portion convex spherical surface to the top of the piston, to the diameter D2 is greater than 0.005 and less than 0.049.

17. The combustion chamber of claim 16 wherein the ratio of the certain distance H2 to the diameter D2 is preferably substantially 0.073.

18. The combustion chamber of claim 1 wherein the ratio of the annular sidewall surface radius R1 to the diameter D2 is greater than 0.11 and less than 0.65.

19. The combustion chamber of claim 18 wherein the ratio of the radius R1 to the diameter D2 is preferably substantially 0.412.

20. The combustion chamber of claim 1 wherein the ratio of the radius R2 of the surface connecting the center portion spherical surface to the bottom margin to the diameter D2 is greater than 0.01 and less than 0.33.

21. The combustion chamber of claim 20 wherein the ratio of the radius R2 to the diameter D2 is preferably substantially 0.068.

22. The combustion chamber of claim 1 wherein the ratio of the radius R3 of the surface connecting the bottom margin to the annular sidewall surface to the diameter D2 is greater than 0.01 and less than 0.33.

23. The combustion chamber of claim 22 wherein the ratio of the radius R3 to the diameter D2 is preferably substantially 0.068.

24. The combustion chamber assembly of claim 1 being formed free of flat surfaces.

25. A piston for use in a diesel engine, the piston having a central axis, comprising:

a combustion chamber being defined in a crown of the piston, the combustion chamber having a center portion being elevated relative to a bottom plane of the combustion chamber, the center portion being defined at least in part by a portion of a convex sphere, the sphere having a radius and an origin, the origin of the radius lying on the piston central axis;

the combustion chamber further having a bottom margin, the bottom margin being defined in part by a portion of a concave sphere, the sphere having a radius and an origin, the origin of the radius lying on the piston central axis and the radius being greater than the center portion radius; and the combustion chamber having a plurality of curved surfaces having smooth transitions between adjacent smooth surfaces, the smooth surfaces including the spherical center portion and the spherical bottom margin and an annular sidewall.

26. The piston of claim 25 wherein the origin of the center portion spherical surface lies in the bottom plane or lies above or below the bottom plane.

27. The piston of claim 26 wherein the origin of the center portion spherical surface lies coincident with a point of intersection of the bottom plane with the piston central axis.

28. The piston of claim 25 wherein the distance between the origin of the convex spherical surface, RS1, and the intersection of the piston center axis and the bottom plane of the combustion chamber is equal to or greater than zero and less than 0.3 piston diameter, D1.

29. The piston of claim 28 wherein the distance between the origin of the concave spherical bottom margin and the point of intersection of the bottom plane and the piston central axis is equal to or greater than 1.0 times the diameter of the piston, D1, and less than 8.0 D1.

30. The piston of claim 25 wherein the ratio of the radius of the center portion convex spherical surface, RS1, to the maximum diameter, D2, of the combustion chamber is greater than 0.11 and less than 0.44.

31. The piston of claim 25 wherein the ratio of the radius of the center portion convex spherical surface, RS1, to the maximum diameter, D2, of the combustion chamber is substantially 0.245.

32. The piston of claim 29 wherein the distance between the point of origin of the concave spherical bottom margin and the point of intersection of the bottom plane and a piston central axis is preferably 2.5 times the diameter D1 of the piston.

33. The piston of claim 25 wherein the ratio of the radius of the concave bottom spherical surface, RS2, to the maximum diameters, D2, of the combustion chamber is between 1.5 and 30.0.

34. The piston of claim 33 wherein the ratio of the radius of the concave bottom spherical surface, RS2, to the maximum diameter, D2, of the combustion chamber is substantially 3.432.

35. The piston of claim 25 wherein the ratio of the diameter, D3, of the combustion chamber at the point of intersection with the crown of the piston to the maximum diameter, D2, of the combustion chamber is greater than 0.70 and less than 0.995.

36. The piston of claim 35 wherein the ratio of the diameter, D3, of the combustion chamber at the point of intersection with the crown of the piston to the maximum diameter, D2, of the combustion chamber is substantially 0.832.

37. The piston of claim 25 wherein the ratio of the maximum diameter of the combustion chamber, D2, to the diameter of the piston, D1, is between 0.42 and 0.88.

38. The piston of claim 25 wherein the ratio of a certain distance, H1, the certain distance H1 being from the bottom plane to the crown of the piston, to the maximum diameter D2 of the combustion chamber is greater than 0.13 and less than 0.49.

39. The piston of claim 38 wherein the ratio of the certain distance H1 to the maximum diameter D2 of the combustion chamber is substantially 0.318.

40. The piston of claim 25 wherein the ratio of a certain distance H2, the distance H2 being from a peak of the convex spherical center portion to the top surface of the piston, to the diameter D2 is greater than 0.005 and less than 0.049.

41. The piston of claim 40 wherein the ratio of the certain distance H2 to the diameter D2 is preferably substantially 0.073.

42. The piston of claim 25 wherein the ratio of the annular sidewall surface radius R1 to the diameter D2 is greater than 0.11 and less than 0.65.

43. The piston of claim 42 wherein the ratio of the radius R1 to the diameter D2 is preferably substantially 0.412.

44. The piston of claim 25 wherein the ratio of the radius R2 of the surface connecting the center portion spherical surface to the bottom margin to the diameter D2 is greater than 0.01 and less than 0.33.

45. The piston of claim 44 wherein the ratio of the radius R1 to the diameter D2 is preferably substantially 0.068.

46. The piston of claim 25 wherein the ratio of the radius R3 of the surface connecting the bottom margin to the annular sidewall surface to the diameter D2 is greater than 0.01 and less than 0.33.

47. The piston of claim 46 wherein the ratio of the radius R3 to the diameter D2 is preferably substantially 0.068.

48. The piston of claim 25, the combustion chamber being formed free of flat surfaces.

49. A method of forming a combustion chamber for use in a diesel engine, comprising:
    defining a combustion chamber in a crown of a piston, the piston having a central axis, defining the combustion chamber by the steps of:
        defining a combustion chamber center portion being elevated relative to a bottom plane of the combustion chamber;
        defining the center portion at least in part by a portion of a convex sphere, the sphere having a radius,
        defining a combustion chamber bottom margin in part by a concave sphere, the sphere having a radius;
        locating the origin of said radii on the piston central axis; and
        defining a plurality of combustion chamber curved surfaces having smooth transitions between adjacent smooth surfaces, the smooth surfaces including the spherical center portion and the spherical bottom margin and a sidewall annular surface.

50. The method of claim 49 including locating the origin of the center portion spherical surface in the bottom plane or above or below the bottom plane.

51. The method of claim 50 including locating the origin of the center portion convex spherical surface coincident with a point of intersection of the bottom plane with the piston central axis.

52. The method of claim 49 including disposing the center portion spherical portion relative to the spherical bottom margin such that the distance between the origin of the convex spherical surface, RS1, and the intersection of the piston center axis and the bottom plane of the combustion chamber is equal to or greater than zero and less than 0.3 piston diameters, D1.

53. The method of claim 52 including disposing the spherical center portion relative to the spherical bottom margin such that the distance between the origin of the spherical center portion and the origin of the spherical bottom margin is more than 1.0 times the diameter, D1, of the piston and less than 8.0 D1.

54. The method of claim 49 including defining the center portion radius, RS1, such that the ratio of the radius RS1 to the maximum diameter, D2, of the combustion chamber is greater than 0.11 and less than 0.44.

55. The method of claim 54 including defining the center portion radius RS1 such that the ratio of the radius RS1 to the maximum diameter, D2, of the combustion chamber is substantially 0.245.

56. The method of claim 53 including disposing the center portion spherical surface relative to the spherical bottom margin such that the distance between the origin of the center portion spherical surface and the origin of the spherical bottom margin is substantially 2.5 times the diameter D1 of the piston.

57. The method of claim 49 including defining the combustion chamber such that the ratio of the radius of the concave bottom spherical surface, RS2, to the maximum diameter, D2, of the combustion chamber is between 1.5 and 30.0.

58. The method of claim 49 including defining the combustion chamber such that the ratio of the diameter D3 of the combustion chamber at the point of intersection with the crown of the piston to the maximum diameter D2 of the combustion chamber is greater than 0.70 and less than 0.995.

59. The method of claim 58 including defining the combustion chamber such that the ratio of the diameter D3 of the combustion chamber at the point of intersection with the crown of the piston to the maximum diameter D2 of the combustion chamber is substantially 0.832.

60. The method of claim 49 including defining the combustion chamber such that the ratio of the maximum diameter of the combustion chamber, D2, to the diameter of the piston, D1, is between 0.42 and 0.88.

61. The method of claim 49 including forming the combustion chamber free of flat surfaces.

* * * * *

UNITED STATES PATENT AND TRADEMARK OFFICE
CERTIFICATE OF CORRECTION

PATENT NO. : 6,536,404 B2
DATED : March 25, 2003
INVENTOR(S) : Zhengbai Liu and Xinqun Gui It is certified that error appears in the above-identified patent and that said Letters Patent is hereby corrected as shown below:

<u>Title page,</u>
Item [75], should read -- [75] Inventors: Zhengbai Liu, Lisle, IL (US); Xinqun Gui, Lisle, IL (US) --

Signed and Sealed this

Second Day of September, 2003

JAMES E. ROGAN
*Director of the United States Patent and Trademark Office*